(12) United States Patent
Haugseter et al.

(10) Patent No.: US 10,153,482 B2
(45) Date of Patent: *Dec. 11, 2018

(54) METHOD FOR MANUFACTURING OF SLURRY FOR PRODUCTION OF BATTERY FILM

(71) Applicant: ELECTROVAYA INC., Mississauga (CA)

(72) Inventors: Bjorn Haugseter, Skien (NO); Tom Henriksen, Skien (NO); Lars Ole Valøen, Porsgrunn (NO); Akhilesh Kumar Srivastava, Skien (NO)

(73) Assignee: ELECTROVAYA INC., Mississauga (CA)

( * ) Notice: Subject to any disclaimer, the term of this patent is extended or adjusted under 35 U.S.C. 154(b) by 121 days.

This patent is subject to a terminal disclaimer.

(21) Appl. No.: 15/138,797

(22) Filed: Apr. 26, 2016

(65) Prior Publication Data
US 2016/0365568 A1 Dec. 15, 2016

Related U.S. Application Data

(63) Continuation of application No. 13/882,501, filed as application No. PCT/IB2011/054738 on Oct. 24, 2011, now Pat. No. 9,324,998.

(30) Foreign Application Priority Data

Oct. 28, 2010 (NO) .................................... 20101514

(51) Int. Cl.
*H01M 4/36* (2006.01)
*H01M 4/131* (2010.01)
(Continued)

(52) U.S. Cl.
CPC ......... *H01M 4/364* (2013.01); *H01M 4/0402* (2013.01); *H01M 4/0404* (2013.01);
(Continued)

(58) Field of Classification Search
CPC .. H01M 4/364; H01M 4/0402; H01M 4/0404; H01M 4/1391; H01M 10/0525
See application file for complete search history.

(56) References Cited

U.S. PATENT DOCUMENTS 5,491,037 A    2/1996  Kawakami
2005/0034299 A1   2/2005  Kurihara et al.
(Continued)

FOREIGN PATENT DOCUMENTS

CN      1691375 A    11/2005
DE      19952335      5/2001
(Continued)

OTHER PUBLICATIONS

IPRP for related PCT/IB2001/054738, completed Apr. 3, 2013.
ISR for related PCT/IB2001/054738, dated Feb. 24, 2012.

*Primary Examiner* — Jonathan G Jelsma
(74) *Attorney, Agent, or Firm* — McAndrews, Held & Malloy, Ltd.

(57) ABSTRACT

The present invention relates to a method for manufacturing slurry for coating of electrodes for use in lithium ion batteries, wherein the method comprises mixing active materials with a binder into a binder solution, and adding an organic carbonate to the binder solution to generate the slurry. The present invention also relates to a method for manufacturing electrodes for a lithium battery cell, wherein the method comprises mixing active materials with a binder into a binder solution, adding an organic carbonate to the binder solution to generate slurry, wherein the above adding step is carried out at temperature above melting temperature of the organic carbonate, coating electrode material with the
(Continued)

slurry, drying the coating on the electrode material by drying the organic carbonate, and surface treatment of the slurry so that the electrode is prepared for use in a lithium ion battery cell.

14 Claims, 1 Drawing Sheet

(51) Int. Cl.
  *H01M 4/1391* (2010.01)
  *H01M 4/13915* (2010.01)
  *H01M 4/62* (2006.01)
  *H01M 10/0525* (2010.01)
  *H01M 10/058* (2010.01)
  *H01M 4/04* (2006.01)
  *H01M 4/139* (2010.01)
  *H01M 4/136* (2010.01)
  *H01M 4/485* (2010.01)
  *H01M 4/505* (2010.01)
  *H01M 4/525* (2010.01)
  *H01M 4/58* (2010.01)

(52) U.S. Cl.
  CPC ....... *H01M 4/0435* (2013.01); *H01M 4/0471* (2013.01); *H01M 4/131* (2013.01); *H01M 4/136* (2013.01); *H01M 4/139* (2013.01); *H01M 4/1391* (2013.01); *H01M 4/13915* (2013.01); *H01M 4/485* (2013.01); *H01M 4/505* (2013.01); *H01M 4/525* (2013.01); *H01M 4/5825* (2013.01); *H01M 4/62* (2013.01); *H01M 4/621* (2013.01); *H01M 4/623* (2013.01); *H01M 10/058* (2013.01); *H01M 10/0525* (2013.01); *Y02E 60/122* (2013.01); *Y02P 70/54* (2015.11); *Y10T 29/49115* (2015.01)

(56) References Cited

U.S. PATENT DOCUMENTS

| | | |
|---|---|---|
| 2005/0191550 A1 | 9/2005 | Satoh et al. |
| 2005/0271797 A1 | 12/2005 | Na et al. |
| 2007/0087267 A1* | 4/2007 | Kim .................... H01M 4/0404 |
| | | 429/217 |
| 2010/0167129 A1 | 7/2010 | Wu et al. |
| 2011/0076557 A1* | 3/2011 | Ishii ..................... B60L 3/0046 |
| | | 429/199 |

FOREIGN PATENT DOCUMENTS

| | | |
|---|---|---|
| DE | 10352063 | 6/2005 |
| JP | H07105940 | 4/1995 |
| JP | 9167614 | 6/1997 |
| JP | H11250892 | 9/1999 |
| JP | 2000150320 | 5/2000 |
| JP | 2005353570 | 12/2005 |
| JP | 2010064022 | 3/2010 |

* cited by examiner

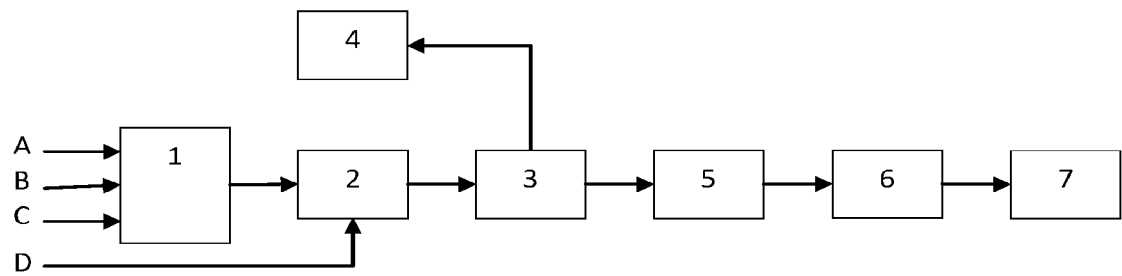

METHOD FOR MANUFACTURING OF SLURRY FOR PRODUCTION OF BATTERY FILM

CROSS-REFERENCE TO RELATED APPLICATIONS

This application is a continuation of U.S. patent application Ser. No. 13/882,501, filed Apr. 29, 2013, which is a national stage entry of International Patent Application No. PCT/IB2011/054738, filed on Oct. 24, 2011, which claims priority from Norwegian Patent Application No. 2010 1514, filed on Oct. 28, 2010, the disclosures of each of which are incorporated herein by reference in their entireties.

TECHNICAL FIELD

The present invention relates to a method for manufacturing a slurry for production of a battery film. More specifically, the present invention relates to a method for generating a slurry for application of anode and cathode materials in batteries, in addition to a method for manufacturing of cathodes and anodes for lithium batteries and a method for manufacturing a lithium battery cell.

BACKGROUND TECHNIQUE

A lithium battery is made from three main components: anode, cathode and electrolyte.

Anode and cathode normally consist of metal foils which are covered by a thin layer of a powder mixture, active materials, which are bound together by a binder. The binders function is to glue the powder particles together and glue these firmly to the metal foil. The binder must be flexible and chemically stable towards the electrolyte.

A typical anode consists of a copper foil which is covered by a thin layer (40-100 microns) with graphite powder, carbon, which is tied together by means of the plastic material PVDF (polyvinylidene fluoride).

A typical cathode consists of an aluminum foil which is coated by a thin layer (40-100 microns) of lithium metal oxide which is bound together by the plastic material PVDF.

A typical electrolyte is a mixture of a lithium salt such as lithium hexafluorophosphate ($LiPF_6$), lithium tetrafluorophosphate ($LiPF_4$), lithium hexafluoroarsenate ($LiAsF_6$), lithium perchlorate ($LiClO_4$), Lithium tetrafluoroborate ($LiBF_4$), and lithium triflate ($LiCF_3SO_3$) and organic carbonates, for instance EC (ethylene carbonate), DEC (diethyl carbonate) and DMC (dimethyl carbonate).

The most common manufacturing process for making a battery film for lithium ion batteries is to blend active materials and PVDF, and mix this into a solvent dissolving the PVDF. The purpose to dissolve the binder is to disperse the material evenly between the particles in the powder mixture in order to secure a good binding between these. This mixture is then applied to the metal foil by means of extrusion, rolling or tape-casting depending on selected process and amount of solvents used. After application the foil will be dried by evaporation of solvents.

The most common solvent in order to dissolve PVDF is NMP (N-Methyl-Pyrrolidone), which is both a toxic and environmentally harmful chemical. There are a variety of alternative solvents, but most of them have in common that they are either toxic, liable to catch fire or unfavorable relating to the chemical structure of the finished battery. Consequently, it is important that the solvent is fully removed from the battery film during production and that the evaporation of NMP is controlled with regards to the environmental requirements. The process of removing the last remnants of the solvent (down to ppm level) from the battery film is a demanding process which is both energy- and space-demanding and makes substantial demands from the technical equipment.

There are waterborne manufacturing processes in which the powder is mixed with water to form a paste or thin slurry. The disadvantage of using water is the relatively energy demanding process to evaporate the water so that the dried battery film must be completely free from water so that the battery shall operate.

From US 2005/0271797 A1 it is known that a production process for a lithium battery consisting of the steps of a) prepare an EC (ethylene carbonate) solution by loosening EC-crystals in a suitable solvent, (b) then dissolve a binder in a suitable solvent in order to make a binder solution and then add and mix sufficiently an active electrode material and an electric conductive material of a wanted composition into the binder solution, (c) add a defined amount of the EC mixture prepared in step (a) into the binder solution from step (b), blend the mixture of EC solution and the binder solution sufficiently so that the slurry in form of an electrode binder can be coated onto an electrode, (e) coat a collector with the slurry, (f) dry the paste layer at a given temperature, and complete the electrode production by pressing a dried electrode structure at a given pressure after the slurry has dried. The process described in US 2005/0271797 A1 also comprises mixing a solvent together with an ethylene carbonate plus insert a second solvent to a binder solution together with an active material for then subsequently to add a given amount of the solvent mixed with ethylene carbonate to the mixture of the binder solution with the other solvent. Thus the process comprises the application of at least one solvent for generating the slurry.

There is a need for providing a manufacturing process of slurry for electrode materials for lithium batteries which is not burdened with the problems associated with use of solvents indicated above.

SUMMARY OF THE INVENTION

There is a purpose with the present invention to provide a method for manufacturing of slurry for application onto cathode and anode materials in batteries, a method for manufacturing of cathodes and anodes for lithium batteries plus a method for manufacturing of a lithium ion battery cell, where the above mentioned problems are solved.

More exactly, the present invention is stating a method for manufacturing slurry for coating of electrodes for use in a lithium ion battery. The method comprises steps of:
a) Mixing active materials with a binder into a binder solution, and
b) Adding an organic carbonate to a binder solution to generate the slurry.

According to one aspect of the invention, the mixing process is executed according to the steps a) and b), wherein the above step b) is carried out at a temperature above the melting temperature of the organic carbonate (C).

According to another aspect of the invention the active materials (A) are adapted to an anode and a cathode.

In accordance with yet another aspect of the invention, the active cathode material is selected from the group of: $LiCoO_2$, $LiFePO_4$, $LiMn2O_4$, $LiNiO_2$, $Li_2FePO_4F$, $LiCo_{1/3}Ni_{1/3}Mn_{1/3}O_2$, and $Li(Li_\alpha Ni_x Mn_y Co_z)$ and the active anode material is selected from the group comprising $LiC_6$, $Li_4Ti_5O_{12}$, Si ($Li_{4.4}Si$) and Ge ($Li_{4.4}Ge$).

In accordance with an additional aspect of the invention, the binder is a polyvinyl fluoride and the organic carbonate is selected from the group comprising ethylene carbonate, dimethyl carbonate and diethyl carbonate.

The present invention also discloses a method for manufacturing of electrodes for a lithium battery cell, the method comprising steps of:
a) Mixing active materials with a binder into a binder solution,
b) Adding an organic carbonate to generate slurry;
wherein the above step b) is carried out at temperature above melting temperature of organic carbonate (C),
c) Coating electrode material with the slurry
d) drying the coating on the electrode material by drying of the organic carbonate, and
e) Surface treatment of the slurry so that the electrode is prepared for use in a lithium battery cell.

The process is also characterized by the fact that step d further may comprise a parallel step of recovery 4 where gases from the organic carbonate is collected for re-use. The collected organic carbonate can be condensed, filtered and cleaned before being used again.

In another implementation step e) comprises one or more sub-steps of:
i) rolling the electrode material,
ii) baking the electrode material, and
iii) finishing the electrode material for use in the lithium battery cell.

In accordance with another aspect of the present invention, the active materials are adjusted for one anode and one cathode respectively, and the active cathode material may be selected from a group comprising $LiCoO_2$, $LiFePO_4$, $LiMn_2O_4$, $LiNiO_2$, $Li_2FePO_4F$, $LiCo_{1/3}Ni_{1/3}Mn_{1/3}O_2$, and $Li(Li_aNi_xMn_yCo_z)$ and the active anode material selected from a group comprising $LiC_6$, $Li_4Ti_5O_{12}$, $Si(Li_{4.4}Si)$ and $Ge(Li_{4.4}Ge)$.

In accordance with an aspect from the present invention, then the binder is a polyvinylidene fluoride.

In another aspect of the present invention, the organic carbonate can be selected from the group comprising ethylene carbonate, diethyl carbonate and dimethyl carbonate.

In another aspect of the invention, a method for generating a lithium battery cell is provided, wherein the method at least comprises the steps of:
a) generating a slurry for coating of electrodes for use in lithium ion batteries, where the slurry comprises active materials, binder and an additional diluting agent (thinner)/organic carbonate (C), where the diluting agent/organic carbonate (C) consists of a component in an electrolyte material for a manufactured lithium battery cell,
wherein, the above step a) is carried out at a temperature above melting temperature of thinner/organic carbonate (C);
b) Coating of an anode material and a cathode material with the slurry,
c) drying the coating on the anode- and cathode material by drying the organic carbonate, and
d) Surface treating of the slurry so that the electrode is made ready for use in a lithium ion battery cell,
e) Arranging one or several cathodes and anodes in layers with lithium permeable membranes lying between,
f) Arranging the cathodes, the anodes and the permeable membranes in a house with openings, and
g) Filling the house with an electrolyte, wherein the electrolyte includes salts and diluents/organic carbonate with lithium content.

The present invention also relates to slurry comprising active material (A), binder (B) and organic carbonate (C) obtained by method as disclosed herein.

The present invention also relates to an electrode(s) for a lithium battery cell, obtained by the method as disclosed herein.

The present invention also relates to a lithium ion battery cell obtained by the method as disclosed herein.

Further aspects and characteristics of the present invention are set forth in the accompanying independent claims.

BRIEF DESCRIPTION OF THE DRAWINGS

The present invention will be more easy to understand with support of the accompanying FIGURE, where
FIG. 1. shows a principle drawing for manufacturing of slurry for battery electrodes according to the present invention.

DETAILED DESCRIPTION OF THE INVENTION

In the following text, the present invention will be described along with support from the accompanying FIGURE.

It shall be understood that according to the invention, the foil that is normally used as cathodes and anodes also may comprise materials similar to fabrics or more generally, any conductive conductor which is compatible with the methods according to the present invention.

First, there will be a description of general implementation of the invention, followed by examples of the methods that will be shown.

As indicated introductorily, there exists a desire to change the process of manufacturing the slurry for coating of battery electrodes for lithium batteries.

Lithium ion batteries normally consist of three active elements, namely anode, cathode and an electrolyte. As indicated above, it is the purpose of the present invention to find an alternative to the disadvantageous use of solvents for coating of the electrode foils.

The slurry that is applied to the electrode foils must have the correct body and viscosity so that the active layer that is applied to the electrodes will have a correct dry film thickness and homogeneity.

In order to be able to form a paste or thin liquid slurry from binder, such as PVDF and powder in the form of active materials, a liquid needs to be added. By using a liquid which is entered as a component in the finished battery it is not necessary that the liquid is removed completely. In the event the liquid is removed completely, this component will still have to be added at a later stage. According to the execution of the present invention, a method for manufacturing of the slurry for coating of battery electrodes is provided, wherein the slurry, meaning active components and a binder, will be diluted with a diluting agent, wherein the diluting agent is a component of the electrolyte which shall be used in the same lithium battery.

In general, the process for manufacturing of slurry according to the present invention can be described with support from FIG. 1. Active materials A, which will be constituent parts in the final slurry, will be mixed with a binder B in a first homogenization step 1. In order to obtain correct viscosity and consistency of the slurry, a solvent C is added. It is in accordance with the present invention that the solvent C represents a component of the final lithium ion battery cell.

After the homogenization step, the slurry attains the desired body/viscosity and the electrode material D can be coated with the slurry. The method for coating may be in the form of extruding, rolling or tape casting, or other suitable methods for coating known from the industry.

Step 3 in the method comprises evaporation of the thinner which was added to the homogenization process 1. The applied slurry will consequently change from being viscous slurry to become a more solid material.

In parallel with step 3, there may be an active recycling step 4 which recycles the thinner that evaporates.

The step 5 is the step following steps 3 and 4, and is a step where the electrode material with the applied coating is rolled.

The step 6 comprises baking of the rolled electrode. This baking will, among other things, secure that the binder adheres sufficiently to the active electrode materials and to the electrode foil.

The final step 7 comprises further finishing of the lithium ion batteries.

It shall be understood that manufacturing according to the steps 1 to 7 may be run consecutively and continuously, so that when step 1 is finished and a batch from step 1 moves onto step 2, then new materials can be added to the homogenization of step 1. The same is valid for all the following steps, so that a manufacturing process can run continuously.

Implementation According to the Present Invention

An example of an embodiment of the present invention will now be described.

In this example, in accordance with the present invention, the materials that will be used in the manufacturing of a lithium ion battery cell will comprise the following.

The anode, that is the negative electrode, consists of a copper foil. This copper foil shall be coated with an active material, generally in the form of a graphite powder ($LiC_6$). Further, other active materials such as titanate ($Li_4Ti_5O_{12}$), $Si(Li_{4.4}Si)$ or $Ge(Li_{4.4}Ge)$ can be used as active anode material. The graphite powder shall be applied to the copper foil. In order for such a coating process to be successful and to obtain a homogeneous surface then the graphite powder must be mixed with PVDF. The PVDF and the graphite powder must consequently be given a viscosity which is suitable for coating. To attain the required viscosity an organic carbonate, such as ethylene carbonate (EC) C is added and blended. This blending step corresponds to the homogenization step 1** according to the general process description. The mixture may be heated to a temperature above the melting point of the thinner/Ethylene Carbonate (C), i.e. the ingredient that was blended in order to give the right viscosity. The temperature may well be above the melting point of the thinner/EC and the temperature can be either above or below the melting point of the binder.

The cathode, i.e. the positive electrode consists of an aluminum foil. This aluminum foil shall be coated by an active material in the form of a lithium metal oxide. The lithium metal oxide shall be coated on the copper foil, so that such a coating process shall be successful and provides for a homogeneous surface. The lithium metal oxide A is mixed with PVDF. The PVDF and lithium metal oxide must consequently be given a viscosity suitable for coating. Therefore, to attain the desired viscosity, an organic carbonate such as Ethylene Carbonate (EC) C is added and the mixture is blended. This step of the mixing corresponds with the homogenization step 1 according to the general process description The following steps for cathode and anode follow generally the same process as described in FIG. 1.

Another Performance Specification According to the Present Invention

Another example embodiment of the present invention will now be described

In this example in accordance with the performance specification of the present invention, the material used during the manufacturing of a lithium ion battery cell comprises the following.

The anode, which is the negative electrode, consists of a copper foil. This copper foil shall typically be coated by an active material in the form of a graphite powder. Thus the process preparing the anode is according to the description above.

The cathode, which is the positive electrode, consists of an aluminum foil. This aluminum foil shall be coated by an active material in the form of a metal oxide such like one of Lithium cobalt oxide ($LiCoO_2$), a polyanion such like Lithium iron phosphate ($LiFePO_4$) or a lithium manganese oxide ($LiMn_2O_4$). Further cathode materials are found in the not supplementary group i.e., $LiNiO_2$, $Li_2FePO_4F$, $LiCo_{1/3}Ni_{1/3}O_2$ and Li ($Li_aNi_xMn_yCo_z)O_2$. For simplicity, the term metal oxide will be used in the following for these mentioned phosphates/oxides.

The metal oxide shall be coated on the copper foil. In order for such a coating process to be successful and obtain a homogeneous surface, the metal oxide A must be mixed [1] with a binder B, for instance PVDF and the metal oxide must in addition be given a viscosity suitable for coating. Therefore, to attain the desired viscosity, an organic carbonate such as ethylene carbonate (EC) C or diethyl carbonate is added to the mixture and blended. This mixing step corresponds to the homogenization step [1] according to the general process description.

The following steps for cathode and anode will roughly follow the same process as described in FIG. 1.

It shall be understood that a number of binders and active raw materials can be combined, where the central issue is that the thinner/organic carbonate (C) shall be a component in the final battery.

It is therefore understood that, there is no need to remove the last remaining concentration of the thinner/organic carbonate (C), thus saving energy.

Following is the description of the electrolyte and the properties associated with the materials composing the parts of the electrolyte. The electrolyte in a normal battery essentially consists of organic carbonates such as EC (ethylene carbonate) or diethyl carbonate. The EC which is most commonly used is a waxy material which melts at approximately 40° C. and is then a liquid with low viscosity. EC is not poisonous. It is without smell and is only flammable at high temperatures (above 140° C.).

According to an aspect of the invention, the desired viscosity of this slurry may be generated by mixing the binder B (such as PVDF), the powder A (active materials) and molten EC C. The amount of EC is adjusted according to the desired viscosity of the mixture.

This mixture is homogenized 1 vigorously at a temperature above the melting point of EC where that temperature may be above or below the melting point of the binder (for example at approx. 180° C. for PVDF). The particles with the binder will then because of the vigorous mixture be dispersed between all the particles in the mixture.

When the mixture is homogenized sufficiently 1, so that the binder particles B are dispersed evenly between all the particles in the mixture, the metal foil D can be coated with the mixture. This may be done by extrusion, rolling or tape-casting. The battery film will then have to be heated 3 in order to evaporate the EC till the EC concentration is equal to or less than the desired EC concentration of the finished battery cell.

The consequent rolling 5 of the battery film will press the particles together and will improve the binding between the particles.

The EC-vapor which is formed by drying of the battery film can be condensed, filtered and reused in the process. EC is a harmless liquid with few health and environmental impacts.

The list of numerals and alphabetic representation is given below:

I:
A: Active materials, such as graphite and lithium oxide
B: Binder, for example PVDF
C: Thinner according to the available invention, an electrolyte component such as organic carbonates
D: Leading foil, such as aluminum foil, copper foil, aluminum canvas and copper canvas among others II:
1: Homogenization
2: Coating, for instance by extruding, tape-casting, rolling or similar
3: Evaporation of solvents
4: Recycling of solvents
5: Rolling
6: Baking, to melt the binder
7: Further processing to build up the battery

The invention claimed is:

1. A method for manufacturing slurry for coating an anode for use in a lithium battery cell, wherein the method comprises the steps of:
   (a) mixing an active material with a binder to obtain a mixture, wherein the active material is selected from a group consisting of $Li_4Ti_5O_{12}$, $Si(Li_{4.4}Si)$, and $Ge(Li_{4.4}Ge)$ and wherein the binder is polyvinylidene fluoride, and
   (b) adding an organic carbonate to the mixture to generate the slurry, wherein the step (b) is carried out at temperature above the melting temperature of the organic carbonate, and wherein the slurry does not contain a solvent other than the organic carbonate.

2. The method of claim 1, wherein the organic carbonate is selected from the group ethylene carbonate, dimethyl carbonate, and diethyl carbonate.

3. A method for manufacturing an anode for a lithium battery cell, wherein the method comprises the steps of:
   (a) mixing an active anode material with a binder to obtain a mixture, wherein the active anode material is selected from a group consisting of $Li_4Ti_5O_{12}$, $Si(Li_{4.4}Si)$, and $Ge(Li_{4.4}Ge)$ and wherein the binder is polyvinylidene fluoride;
   (b) adding an organic carbonate to the mixture to generate a slurry, wherein the step (b) is carried out at temperature above the melting temperature of the organic carbonate, and wherein the slurry does not contain a solvent other than the organic carbonate;
   (c) coating an electrode material with the slurry;
   (d) drying the coating on the electrode material by drying the organic carbonate, wherein step (d) comprises a parallel recycling step, wherein the organic carbonate is collected for re-use; and
   (e) treating the surface of the slurry so that the anode is prepared for use as an anode in a lithium battery cell.

4. The method of claim 3, wherein the collected organic carbonate is condensed, filtered and cleaned before re-use.

5. The method of claim 3, wherein the step (e) comprises one or several of sub-steps of:
   (i) rolling the electrode material;
   (ii) baking the electrode material; and
   (iii) finishing the electrode material for use in the lithium battery cell.

6. The method of claim 3, wherein the organic carbonate is selected from the group ethylene carbonate, diethyl carbonate, and dimethyl carbonate.

7. A method for manufacturing a lithium ion battery cell, wherein the method comprises the steps of:
   (a) manufacturing at least one anode by the method as claimed in claim 3,
   (b) manufacturing at least one cathode by a method comprising the steps of:
      (i) mixing an active cathode material with a cathode binder to obtain a mixture, wherein the active cathode material is selected from a group consisting of $LiCoO_2$, $LiFePO_4$, $LiMn_2O_4$, $LiNiO_2$, $Li_2FePO_4F$, $LiCo_{1/3}Ni_{1/3}O_2$;
      (ii) adding a cathode organic carbonate to the mixture to generate a cathode slurry, wherein step (ii) is carried out at temperature above the melting temperature of the cathode organic carbonate, and wherein the cathode slurry does not contain a solvent other than the cathode organic carbonate;
      (iii) coating a cathode material with the cathode slurry;
      (iv) drying the coating on the cathode material by drying the cathode organic carbonate, wherein step (iv comprises a parallel recycling step, wherein the cathode organic carbonate is collected for re-use; and
      (v) treating the surface of the cathode slurry so that the cathode is prepared for use in a lithium battery cell;
   (c) arranging the at least one anode and the at least one cathode in layers with lithium ion permeable membranes in between;
   (d) arranging the at least one anode, the at least one cathode, and the permeable membranes in a house with openings; and
   (e) filling the house with an electrolyte comprising lithium containing salts and an organic carbonate.

8. The method of claim 7, wherein step (c) further comprises arranging at least two cathodes and at least two anodes in layers with lithium ion permeable membranes in between and step (d) further comprises arranging the at least two cathodes, the at least two anodes, and the lithium ion permeable membranes in a house with openings.

9. The method of claim 7, wherein the cathode binder is polyvinylidene fluoride.

10. The method of claim 7, wherein the cathode organic carbonate is selected from the group ethylene carbonate, diethyl carbonate, and dimethyl carbonate.

11. The method of claim 7, wherein the organic carbonate used to fill the house is selected from the group ethylene carbonate, diethyl carbonate, and dimethyl carbonate.

12. An anode for a lithium battery cell, wherein the anode is coated with a slurry consisting of active material, binder, and organic carbonate, wherein the active material and binder are mixed to obtain a mixture and organic carbonate is added to the mixture and heated to a temperature above the melting temperature of the organic carbonate;
   wherein the active material is selected from a group consisting of $Li_4Ti_5O_{12}$, $Si(Li_{4.4}Si)$, and $Ge(Li_{4.4}Ge)$;
   wherein the binder is polyvinylidene fluoride; and
   wherein the organic carbonate is selected from the group ethylene carbonate, dimethyl carbonate, and diethyl carbonate.

13. A lithium ion battery cell comprising the anode of claim 12 and a cathode.

14. The lithium ion battery cell of claim 13, wherein the cathode comprises an active cathode material selected from a group consisting of $LiCoO_2$, $LiFePO_4$, $LiMn_2O_4$, $LiNiO_2$, $Li_2FePO_4F$, $LiCo_{1/3}Ni_{1/3}Mn_{1/3}O_2$.

* * * * *